(12) United States Patent
Rumpf

(10) Patent No.: US 6,955,158 B2
(45) Date of Patent: Oct. 18, 2005

(54) FUEL CONTAINER FOR A MOTOR VEHICLE

(75) Inventor: Bernd Rumpf, Nidderau-Windecken (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/935,767

(22) Filed: Sep. 8, 2004

(65) Prior Publication Data

US 2005/0051141 A1 Mar. 10, 2005

(30) Foreign Application Priority Data

Sep. 10, 2003 (DE) ................ 103 42 081

(51) Int. Cl.[7] ............................................ F02M 37/04
(52) U.S. Cl. ................ 123/514; 123/509; 137/565.22; 137/574; 417/40
(58) Field of Search ................ 123/509, 497, 123/514, 198 D; 417/40, 41; 137/398, 399, 137/574, 565.22, 565.34, 565.17

(56) References Cited

U.S. PATENT DOCUMENTS

| | | | | |
|---|---|---|---|---|
| 5,040,516 A | * | 8/1991 | Haraguchi | ........... 123/509 |
| 5,749,345 A | * | 5/1998 | Treml | ........... 123/456 |
| 5,797,377 A | * | 8/1998 | Fischerkeller | ........... 123/514 |
| 6,123,511 A | * | 9/2000 | Sertier | ........... 417/87 |
| 6,276,342 B1 | * | 8/2001 | Sinz et al. | ........... 123/514 |
| 6,283,142 B1 | * | 9/2001 | Wheeler et al. | ........... 137/265 |
| 6,425,378 B1 | * | 7/2002 | Frank | ........... 123/514 |
| 6,505,644 B2 | * | 1/2003 | Coha et al. | ........... 137/565.22 |
| 6,553,973 B1 | * | 4/2003 | Coha et al. | ........... 123/509 |
| 6,609,537 B1 | * | 8/2003 | Horrer et al. | ........... 137/587 |
| 6,792,966 B2 | * | 9/2004 | Harvey | ........... 137/265 |
| 6,810,908 B2 | * | 11/2004 | Eck et al. | ........... 137/565.22 |

FOREIGN PATENT DOCUMENTS

| | | |
|---|---|---|
| DE | 197 09 738 A1 | 9/1998 |
| DE | 199 33 044 A1 | 1/2001 |

* cited by examiner

*Primary Examiner*—Carl S. Miller
(74) *Attorney, Agent, or Firm*—Richard A. Speer; Mayer, Brown, Rowe & Maw, LLP

(57) ABSTRACT

In a fuel container (1) for a motor vehicle having a plurality of chambers (2, 4), a suction jet pump (18, 19) with a filling level sensor (11, 12) is arranged in each of the individual chambers (2, 4). A valve (24, 25) is arranged in a propellant line (20, 21) leading to the suction jet pump (18, 19). When a chamber (2, 4) is virtually empty, the supply of fuel to the suction jet pump (18, 19) is disabled and an unnecessary movement of the fuel is thus avoided.

7 Claims, 2 Drawing Sheets

FUEL CONTAINER FOR A MOTOR VEHICLE

BACKGROUND OF THE INVENTION

The invention relates to a fuel container for a motor vehicle having a plurality of chambers for collecting fuel, having a fuel feeding unit whose feeding capacity can be regulated, having suction jet pumps which are arranged in at least some of the chambers of the fuel container and have the purpose of feeding fuel to the feeding unit, having a propellant line which leads from the pressure side of the fuel feeding unit to the suction jet pump, having a filling level sensor for acquiring the filling level of fuel, and having a control unit for evaluating the signals of the filling level sensor and for actuating the feeding unit.

Such fuel containers are usually designed as a saddle tank and are known from practice. In this context, the suction jet pumps are used to feed the fuel from the corresponding chamber to the feeding unit or to the chamber holding the feeding unit. The feeding unit frequently has a surge chamber which can be filled by a further suction jet pump and has the purpose of collecting fuel. It is already known to regulate the feeding capacity of the feeding unit as a function of signals of a pressure regulator which is arranged in the forward feed line, and thus as a function of the consumption of the fuel, in order to avoid unnecessarily pumping fuel around the fuel container. However, even when there is particularly low consumption, the feeding unit must maintain the feeding of fuel to the suction jet pumps, and thus ensure a minimum feeding capacity. This is generally achieved with a minimum pump rotational speed. As the number of chambers increases, the minimum feeding capacity rises since the number of suction jet pumps also rises.

A disadvantage with the known fuel container is that a large amount of fuel is moved to the fuel container as a result of the feeding capacity of the feeding unit which is defined by the number of suction jet pumps. In addition, when a fuel container is virtually empty, all the suction jet pumps are supplied with fuel via the propellant lines, even if there is no fuel present in the respective chamber. This movement leads to the formation of foam and to increasing vaporization of the fuel, which results in a high level of permeation of the fuel into the surroundings of the fuel container.

The invention is based on the problem of designing a fuel container of the type mentioned at the beginning in such a way that the movement of fuel is kept as low as possible.

BRIEF DESCRIPTION OF THE INVENTION

This problem is solved according to the invention in that in each of a plurality of chambers there is arranged a filling level sensor for determining the filling level of fuel in the respective chamber, and in that means for reducing the feeding of fuel to the suction jet pump located in a virtually empty chamber are provided.

As a result of this design, the feeding capacity with one or more empty chambers of the fuel container can be reduced in such a way that the suction jet pumps receive less fuel, or no fuel at all. The reduction of the feeding of fuel to the suction jet pumps leads to a reduction in the movement of the fuel in the fuel container. It is not necessary to arrange a suction jet pump with a filling level sensor in each individual chamber. It may be sufficient if suction jet pumps and filling level sensors are arranged in some of the chambers.

The means for reducing the feeding are embodied, according to one advantageous development of the invention, in a particularly simple structural way if the control unit is designed to reduce the feeding capacity of the feeding unit when a chamber is virtually empty. As a result, the feeding capacity of the feeding unit can be adapted as a function of the filling level of fuel in the respective chambers of the fuel container according to the invention.

According to one advantageous development of the invention, the control unit is capable of determining the filling levels of the individual chambers separately and regulating the feeding capacity of the feed unit as a function of the filling levels if a filling level sensor is arranged in each of the chambers and if the filling level sensors are individually connected to the control unit. This design has the advantage that a suction jet pump which is provided in the first chamber for filling a surge chamber of the feeding unit also receives less fuel or no fuel if the first chamber is empty.

In addition to the separate arrangement of the control unit, this function can also be integrated into the engine control electronics.

According to another advantageous development of the invention, the supply of fuel to the suction jet pump can simply be disabled when a chamber is virtually empty if a valve which can be switched as a function of the filling level in the chamber which contains the suction jet pump is arranged in the propellant line.

The valve is capable of automatically disabling the supply of fuel to the suction jet pump when the feeding capacity of the feeding unit is reduced, if the valve is designed as a pressure-opening valve and is closed in the home state below a predefined pressure in the propellant line.

When there are a plurality of chambers and suction jet pumps, it is possible, according to another advantageous development of the invention, to switch off the suction jet pumps individually if the valve can be switched electrically and is connected to the control unit.

According to another advantageous development of the invention, the suction jet pumps can each easily be combined with a filling level sensor and the valve to form one structural unit if the valve can be switched by a float of the filling level sensor. In the simplest case it is sufficient to connect a closing element of the valve to the float via a linkage. This contributes to reducing the effort involved in mounting the fuel container according to the invention.

According to another advantageous development of the invention, the feeding unit can easily be prevented from running dry when there is a defect in the filling level sensors by using means for switching over the feeding unit to maximum pumping capacity and/or for opening the valve arranged in the propellant line when there is a failure of one of the filling level sensors.

BRIEF DESCRIPTION OF THE DRAWINGS

The invention prevents numerous embodiments. In order to clarify its basic principle further, one of these embodiments is illustrated in the drawing and will be described below. In said drawing.

DETAILED DESCRIPTION OF THE INVENTION

Figure 1:
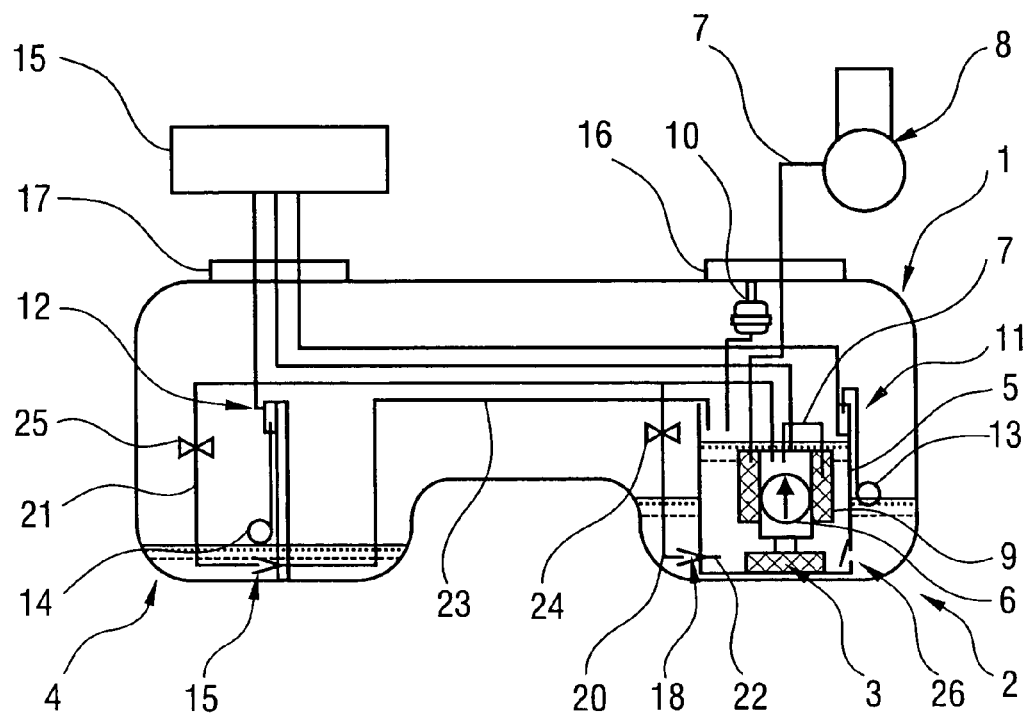
FIG. 1 is a schematic view of a section through a fuel container according to the invention.

FIG. 1 shows a fuel container 1 for a motor vehicle having a fuel feeding unit 3 which is arranged in a first chamber 2, and having a second chamber 4. The fuel feeding unit 3 has an electrically driven fuel pump 6 which is arranged in a surge chamber 5 and has the purpose of feeding fuel to an internal combustion engine 8 of the motor vehicle via a forward feed line 7. A fuel filter 9 and a pressure-regulating valve 10 are arranged in the forward feed line 7. When a pressure which is predefined in the forward feed line 7 is exceeded, fuel is fed back into the surge chamber 5 via the pressure-regulating valve 10. A filling level sensor 11 is arranged on the surge chamber 5. The second chamber 4 also has a filling level sensor 12. The filling level sensors 11, 12 each have a float 13, 14 which follows the filling level of fuel in the respective chamber 2, 4. The filling level sensors 11, 12 and the fuel feeding unit 3 are electrically connected to a control unit 15. Furthermore, the fuel container 1 has two mounting flanges 16, 17 by means of which the various components are mounted in the fuel container 1. A suction jet pump 18, 19 is arranged in each of the chambers 2, 4. The suction jet pumps 18, 19 are connected via propellant lines 20, 21 to the pressure side of the fuel feeding unit 3. Fuel lines 22, 23 lead from the suction jet pumps 18, 19 into the surge chamber 5. A valve 24, 25 is arranged in each of the propellant lines 20, 21. Furthermore, the surge chamber 5 can have a bottom valve 26 which is embodied as a nonreturn valve and which permits fuel to flow from the first chamber 2 into the surge chamber 5, but prevents it from flowing away.

The electronic control system 15 determines the respective state of fuel in the chambers 2, 4 from the signals of the filling level sensors 11, 12 and reduces the feeding capacity of the fuel feeding unit 3 if one of the two chambers 2, 4 is virtually empty. As a result, the quantity of fuel which is fed to the suction jet pumps 18, 19 via the propellant lines 20, 21 is reduced. At the same time, the valves 24, 25 close the corresponding propellant line 20, 21. As a result unnecessary overflowing of fuel is prevented and the formation of foam is reduced.

Figure 2:
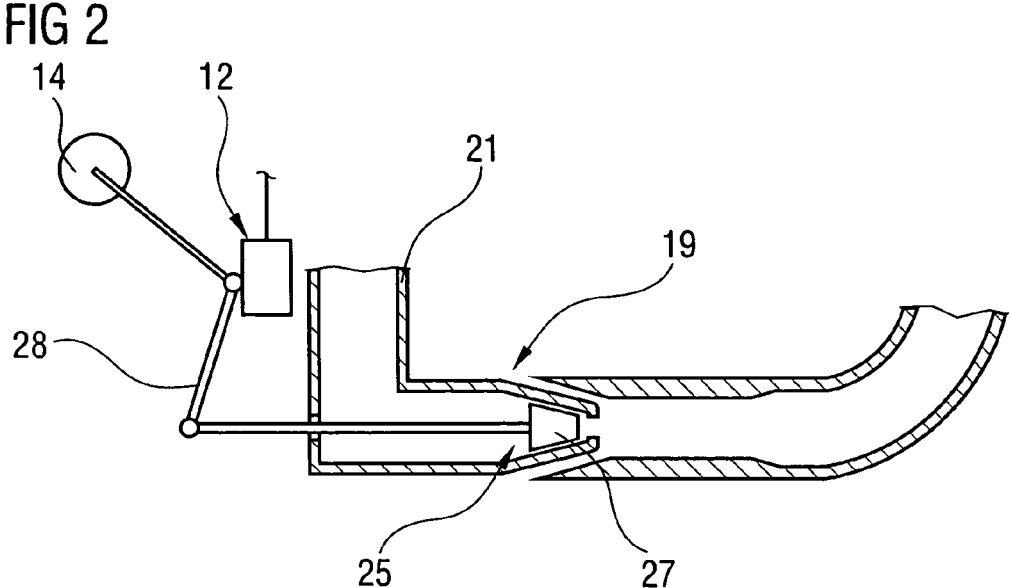
FIG. 2 is a schematic view of a section through a float-activated valve which is arranged in a propellant line of the fuel container from FIG. 1.

FIG. 2 is a schematic view of a section through a first embodiment of the valve 25—arranged in one of the propellant lines 21—of the fuel container 1 from FIG. 1. The valve 25 has a valve body 27 which closes the suction jet pump 19. The valve body 27 is connected to the float 14 of the filling level sensor 12 via a linkage 28. When there is a low filling level in the chamber 4 which accommodates the suction jet pump 19, the valve body 27 is moved to a position which closes the suction jet pump 19. As a result, fuel is prevented from being fed by the suction jet pump 19 when the chamber 4 is virtually empty.

Figure 3:
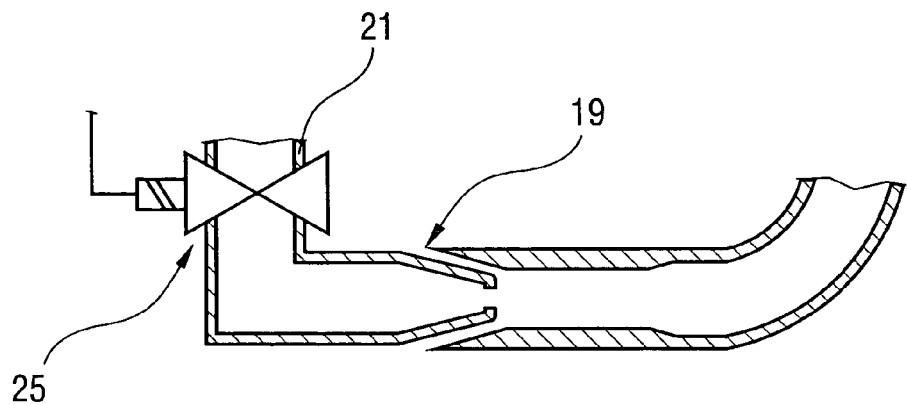
FIG. 3 is a schematic view of a section through an electrically switchable valve which is arranged in a propellant line of the fuel container from FIG. 1.

FIG. 3 is a schematic view of a section through a second embodiment of the valve 25 which is arranged in one of the propellant lines 21. The valve 25 can be switched electrically and connected to the control unit 15 from FIG. 1. If the filling level sensor 12 which is arranged in the corresponding chamber 4 from FIG. 1 determines that the chamber 4 is virtually empty, the control unit 15 actuates the valve 25, as a result of which the propellant line 21 is closed. The corresponding suction jet pump 19 thus receives no fuel.

Figure 4:
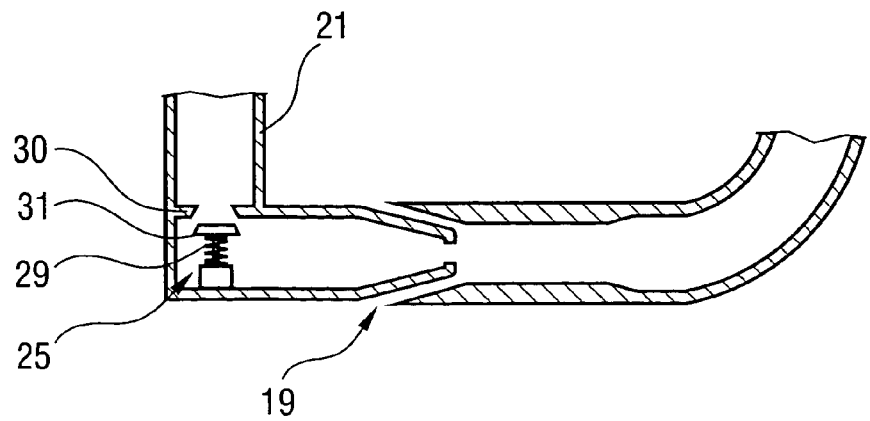
FIG. 4 is a schematic view of a section through a pressure-controlled valve which is arranged in a propellant line of the fuel container from FIG. 1.

FIG. 4 is a schematic view of a further embodiment of the valve 25 which is arranged in one of the propellant lines 21. The valve 25 has a closing body 21 which is prestressed against a valve seat 30 by a spring element 29. If it is determined, by the filling level sensors 11, 12, that one or more chambers 2, 4 of the fuel container 1 from FIG. 1 are virtually empty, the control unit 15 reduces the feeding capacity of the fuel pump 6, which brings about a drop in pressure in the propellant lines 20, 21. When this drop in pressure occurs, the closing body 31 is pressed against the valve seat 30 by the force of the spring element 29, and closes the propellant line 21.

What is claimed is:

1. A fuel container for a motor vehicle having a plurality of chambers for collecting fuel, having a fuel feeding unit whose feeding capacity can be regulated, having suction jet pumps which are arranged in at least some of the chambers of the fuel container and have the purpose of feeding fuel to the feeding unit, having a propellant line which leads from the pressure side of the fuel feeding unit to each respective suction jet pump, having a filling level sensor for acquiring the filling level of fuel, and having a control unit for evaluating the signals of the filling level sensor and for actuating the feeding unit, characterized in that in each of a plurality of fuel collecting chambers there is arranged a filling level sensor for determining the filling level of fuel in each respective chamber, and in that means for reducing the feeding of fuel to the suction jet pump located in a virtually empty chamber are provided.

2. The fuel container as claimed in claim 1, characterized in that the control unit is designed to reduce the feeding capacity of the feeding unit when a fuel chamber is virtually empty.

3. The fuel container as claimed in claim 1 or 2, characterized in that a filling level sensor is arranged in each of the fuel chambers, and in that the filling level sensors are individually connected to the control unit.

4. The fuel container as defined in claim 1, characterized in that a valve which can be switched as a function of the filling level in a chamber which contains a suction jet pump is arranged in the propellant line.

5. The fuel container as defined in claim 4, characterized in that the valve is designed as a pressure-opening valve, and is closed in the home state below a predefined pressure in the propellant line.

6. The fuel container as defined in claim 4 or 5, characterized in that the valve can be switched electrically and is connected to the control unit.

7. The fuel container as defined in claim 4 or 5, characterized in that the valve can be switched by a float of the filling level sensor.

* * * * *